(12) United States Patent
Ouchi

(10) Patent No.: US 11,405,562 B2
(45) Date of Patent: Aug. 2, 2022

(54) IMAGE PROCESSING APPARATUS, METHOD OF CONTROLLING THE SAME, IMAGE CAPTURING APPARATUS, AND STORAGE MEDIUM

(71) Applicant: CANON KABUSHIKI KAISHA, Tokyo (JP)

(72) Inventor: Kenji Ouchi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/210,307

(22) Filed: Mar. 23, 2021

(65) Prior Publication Data

US 2021/0306572 A1    Sep. 30, 2021

(30) Foreign Application Priority Data

Mar. 26, 2020 (JP) .............................. JP2020-056619

(51) Int. Cl.
*H04N 5/243* (2006.01)
*G06T 7/20* (2017.01)
*H04N 5/235* (2006.01)

(52) U.S. Cl.
CPC .............. *H04N 5/243* (2013.01); *G06T 7/20* (2013.01); *H04N 5/2351* (2013.01)

(58) Field of Classification Search
CPC .. H04N 5/243; H04N 5/2351; H04N 5/23229; H04N 2013/0081; H04N 5/2621; G06T 7/20; G06T 7/50; G06T 2207/30196; G06T 5/50; G06T 2207/10028; G06T 2207/10004; G06T 7/194; G06T 7/11; G06T 5/008; G06T 15/50; G06K 9/3233
See application file for complete search history.

(56) References Cited

U.S. PATENT DOCUMENTS

| | | | | |
|---|---|---|---|---|
| 2011/0187920 A1* | 8/2011 | Shimada | ............... | H04N 5/2353 348/371 |
| 2014/0111199 A1* | 4/2014 | Oh | ........................ | G01R 33/543 324/309 |
| 2016/0119526 A1* | 4/2016 | Kitajima | ............ | H04N 5/23219 348/371 |
| 2019/0340737 A1* | 11/2019 | Kawaguchi | ............ | H04N 5/217 |

FOREIGN PATENT DOCUMENTS

JP     2018-185576 A    11/2018

* cited by examiner

*Primary Examiner* — Lin Ye
*Assistant Examiner* — Tuan H Le
(74) *Attorney, Agent, or Firm* — Cowan, Liebowitz & Latman, P.C.

(57) ABSTRACT

An image processing apparatus comprises a first acquisition unit configured to acquire an image shot by continuous shooting while emitting a flash; a second acquisition unit configured to acquire light emission information of the flash in the continuous shooting; a detection unit configured to detect a light emission variation of the flash based on the light emission information; a setting unit configured to set a parameter of a virtual light source for correcting a variation of brightness of the image shot by the continuous shooting due to the light emission variation based on a result of detecting the light emission variation; and a correction unit configured to correct the image shot by the continuous shooting based on the set parameter of the virtual light source.

16 Claims, 9 Drawing Sheets

VIRTUAL LIGHT SOURCE

BEFORE
RELIGHTING PROCESSING

AFTER
RELIGHTING PROCESSING

IMAGE PROCESSING APPARATUS, METHOD OF CONTROLLING THE SAME, IMAGE CAPTURING APPARATUS, AND STORAGE MEDIUM

BACKGROUND OF THE INVENTION

Field of the Invention

The present invention is related to an image processing apparatus capable of correcting the brightness of an inputted image.

Description of the Related Art

Conventionally, a technique called relighting, which is for adjusting the brightness by radiating light from a virtual light source in relation to a subject within a shot image, is known. By appropriately setting parameters of the virtual light source such as the position, intensity, and angle of the virtual light source rather than simply changing the brightness of the entire subject uniformly, a dark region such as a shadow produced by ambient light can be made brighter, and a desired image can be obtained.

In Japanese Patent Laid-Open No. 2018-185576, a technique for setting the parameters of a virtual light source based on information such as the position of a camera, a zoom operation, and a panning operation in order to obtain a desired result of relighting for a moving image is disclosed.

However, the technique disclosed in Japanese Patent Laid-Open No. 2018-185576 is related to control for relighting w % ben shooting moving images, and control for continuous still image shooting involving flash emission is not particularly considered. For example, in continuous shooting involving flash emission, due to a missing flash emission or light emission variation, variation occurs in the brightness of the subject in the respective images even though the images have been continuously shot, and the connection between the previous and next images deteriorates.

SUMMARY OF THE INVENTION

The present invention is made in light of the foregoing a problem, and provides an image processing apparatus capable of preventing variation in brightness between images obtained by continuous shooting involving flash emission.

According to a first aspect of the present invention, there is provided an image processing apparatus comprising: at least one processor or circuit configured to function as: a first acquisition unit configured to acquire an image shot by continuous shooting while emitting a flash; a second acquisition unit configured to acquire light emission information of the flash in the continuous shooting; a detection unit configured to detect a light emission variation of the flash based on the light emission information; a setting unit configured to set a parameter of a virtual light source for correcting a variation of brightness of the image shot by the continuous shooting due to the light emission variation based on a result of detecting the light emission variation; and a correction unit configured to correct the image shot by the continuous shooting based on the set parameter of the virtual light source.

According to a second aspect of the present invention, there is provided an image capturing apparatus comprising: an image capturing device configured to capture a subject; and an image processing apparatus including at least one processor or circuit configured to function as: a first acquisition unit configured to acquire an image shot by continuous shooting while emitting a flash; a second acquisition unit configured to acquire light emission information of the flash in the continuous shooting; a detection unit configured to detect a light emission variation of the flash based on the light emission information; a setting unit configured to set a parameter of a virtual light source for correcting a variation of brightness of the image shot by the continuous shooting due to the light emission variation based on a result of detecting the light emission variation; and a correction unit configured to correct the image shot by the continuous shooting based on the set parameter of the virtual light source.

According to a third aspect of the present invention, there is provided a method of controlling an image processing apparatus, the method comprising: acquiring an image shot by continuous shooting while emitting a flash; acquiring light emission information of the flash in the continuous shooting; detecting a light emission variation of the flash based on the light emission information; setting a parameter of a virtual light source for correcting a variation of brightness of the image shot by the continuous shooting due to the light emission variation based on a result of detecting the light emission variation; and correcting the image shot by the continuous shooting based on the set parameter of the virtual light source.

Further features of the present invention will become apparent from the following description of exemplary embodiments with reference to the attached drawings.

DESCRIPTION OF THE EMBODIMENTS

Figure 1:
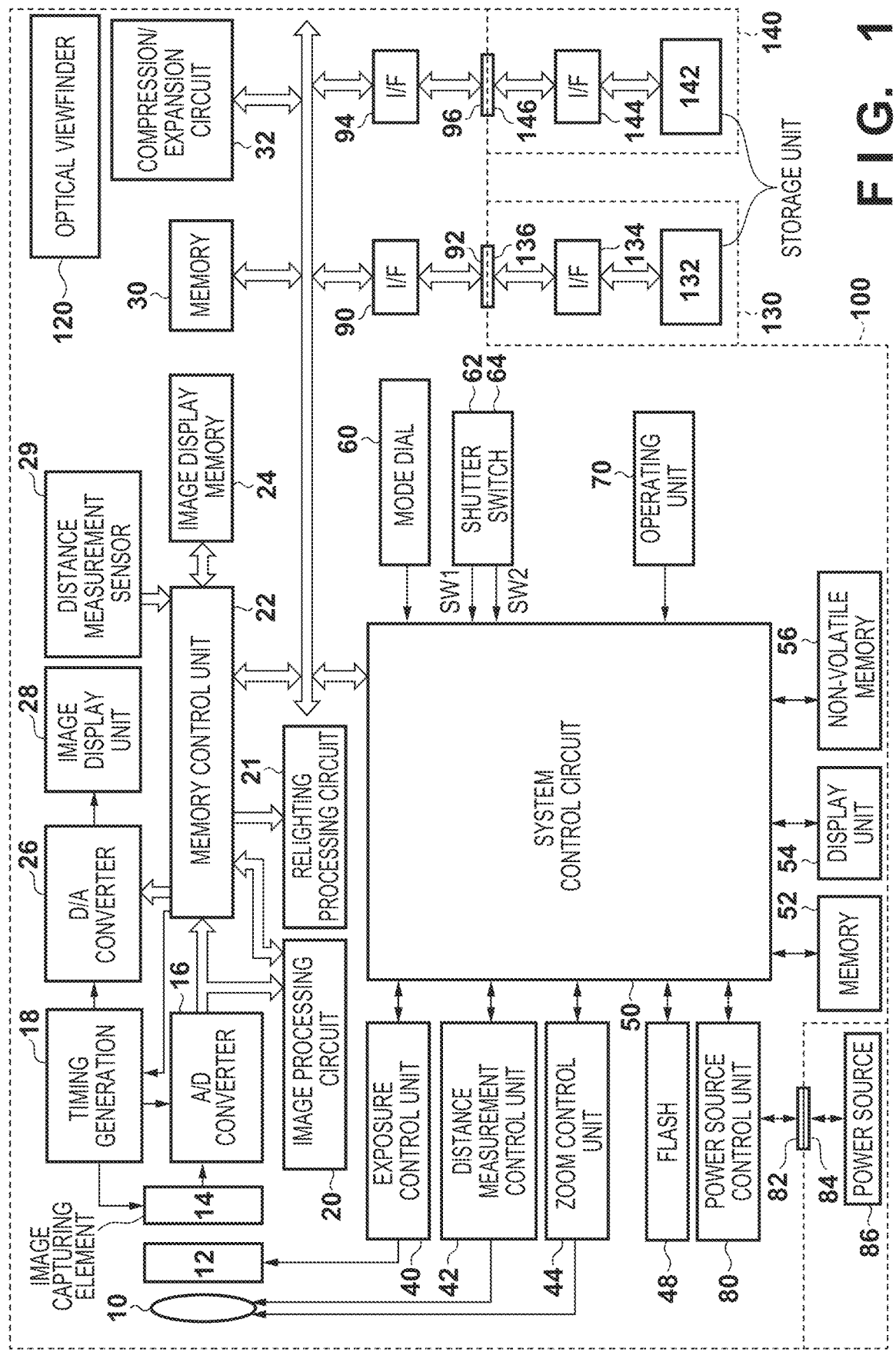
FIG. 1 is a block diagram illustrating a configuration of an image capturing apparatus according to a first embodiment of the present invention.

Hereinafter, embodiments will be described in detail with reference to the accompanying drawings. The following embodiments do not limit the claimed invention. Two or more of the multiple features described in the embodiments may be combined as appropriate. Furthermore, the same reference numerals are given to the same or similar configurations, and redundant description thereof is omitted.

First Embodiment

FIG. 1 is a block diagram illustrating a configuration of an image capturing apparatus 100 according to a first embodiment of the present invention.

In FIG. 1, the image capturing apparatus 100 comprises a shooting lens 10 as an image capturing unit, a shutter 12 having an aperture function, and an image capturing element 14 for converting optical images to electrical signals. Analog image signals generated by the image capturing element 14 are converted to digital signals by an A/D converter 16.

A timing generation circuit 18 is controlled by a memory control circuit 22 and a system control circuit 50 and supplies clock signals and control signals to the image capturing element 14, the A/D converter 16, and a D/A converter 26.

An image processing circuit 20 performs predetermined pixel interpolation processing or color conversion processing in relation to data from the A/D converter 16 or data from the memory control circuit 22. Also, in the image processing circuit 20, TTL (through-the-lens) method AF (autofocus) processing, AE (auto-exposure) processing, and EF (flash pre-emission) processing, in which predetermined computation processing is performed using captured image data and then the system control circuit 50 performs control in relation to an exposure control unit 40 and a distance measurement control unit 42 based on the obtained computation result, are performed. Furthermore, in the image processing circuit 20, the predetermined computation processing is performed using the captured image data, and then TTL method AWB (auto white balance) processing is also performed based on the obtained computation result.

A relighting processing circuit 21 performs relighting processing in relation to the shot images. The memory control circuit 22 controls the A/D converter 16, the timing generation circuit 18, the image processing circuit 20, the relighting processing circuit 21, an image display memory 24, the D/A converter 26, a memory 30, and a compression/expansion circuit 32.

Data from the A/D converter 16 is written directly to the image display memory 24 or the memory 30 via the image processing circuit 20 and the memory control circuit 22 or via the memory control circuit 22.

The image data for display written to the image display memory 24 is displayed by an image display unit 28 configured by a TFT-LCD and the like via the D/A converter 26. By sequentially displaying the captured image data using the image display unit 28, functions of an electronic viewfinder can be realized. Also, the image display unit 28 can turn the display on and off as desired by an instruction of the system control circuit 50, and in a case where the display is turned off, the power consumption of the image capturing apparatus 100 can be significantly reduced.

The memory 30 is a memory for storing shot still images or moving images and comprises sufficient storage capacity for storing a predetermined number of still images or a predetermined length of time of moving images. By this, also in a case where continuous shooting or panorama capturing in which a plurality of still images are continuously shot, high-speed and large-volume image writing can be performed in relation to the memory 30. Also, the memory 30 can be used as a working area of the system control circuit 50.

The compression/expansion circuit 32 is a circuit for compressing and expanding image data by adaptive discrete cosine transform (ADCT) and the like and reads images stored in the memory 30, performs compression processing or expansion processing, and then writes the processed data to the memory 30.

The exposure control unit 40 is a control unit for controlling the shutter 12, which has an aperture function, and the exposure control unit 40 has a function for adjusting flash light in collaboration with a flash 48. The distance measurement control unit 42 controls focusing of the shooting lens 10, and a zoom control unit 44 controls zooming of the shooting lens 10.

The flash 48 also has a function for projecting AF auxiliary light and a function for adjusting flash light. The exposure control unit 40 and the distance measurement control unit 42 perform control using the TTL method, and the system control circuit 50 sends an instruction to the exposure control unit 40 and the distance measurement control unit 42 based on the computation result of computing the captured image data by the image processing circuit 20.

The system control circuit 50 controls the entire image capturing apparatus 100. A memory 52 stores constants, variables, programs, and the like for operating the system control circuit 50.

A display unit 54 has a liquid crystal display apparatus, a speaker, and the like for outputting an operation state, a message, and the like using text, an image, audio, and the like in accordance with the execution of a program in the system control circuit 50. The display unit 54 is positioned at a single or plurality of positions in the vicinity of an operation unit of the image capturing apparatus 100 where they are easily seen and are configured by a combination of an LCD, an LED, a sound generation element, and the like, for example.

Also, some functions of the display unit 54 are positioned within an optical viewfinder 120. Among the display contents of the display unit 54, what are displayed on the LCD and the like are a single shooting/continuous shooting display, a self-timer display, a compression ratio display, a recorded pixel count display, a recorded image count display, a remaining possible shot count display, a shutter speed display, an aperture value display, an exposure correction display, and the like. Furthermore, there are a flash display, a red-eye reduction display, a macro shooting display, a buzzer setting display, a remaining clock battery power display, a battery remaining amount display, an error display, an information display by a multi-digit number, a display of a state of whether storage media 200 and 210 are attached or detached, a communication I/F operation display, a date/time display, and the like. Also, among the display contents of the display unit 54, what are displayed within the optical viewfinder 120 are a focus display, a camera shake warning display, a flash charge display, the shutter speed display, the aperture value display, the exposure correction display, and the like.

A nonvolatile memory 56 is an electrically erasable/recordable memory, and an EEPROM or the like is used, for example. A distance measurement sensor 29 measures a distance to the subject and then outputs distance information corresponding to pixel units of the shot pixels as a two-dimensional distance map image.

Members indicated by reference numerals 60, 62, 64, and 70 are operation units for inputting various operation instructions of the system control circuit 50 and are configured by a single or plurality of combinations of a switch, a dial, a touch panel, pointing by detecting the line of sight, a speech recognition apparatus, and the like.

These operation units will be described here in detail.

A mode dial switch 60 can switch between and set respective function modes such as powered off, an automatic image shooting mode, a still image shooting mode, a moving image shooting mode, a panorama shooting mode, a relighting shooting mode, a playback mode, a multi-frame playback/deletion mode, and a PC connection mode.

A shutter switch SW1 (62) turns on part way through the operation of a shutter button (not shown) and instructs to start an operation such as the AF (autofocus) processing, the AE (auto-exposure) processing, the AWB (auto white balance) processing, and the EF (flash pre-emission) processing.

A shutter switch SW2 (64) turns on at the completion of the operation of the shutter button (not shown) and instructs to start a series of processing operations called the exposure processing, development processing, and recording processing. Note that in the exposure processing, the signals read from the image capturing element 14 are written as image data to the memory 30 via the A/D converter 16 and the memory control circuit 22. In the development processing, development of the image data is performed using computation by the image processing circuit 20 and the memory control circuit 22. In the recording processing, the image data is read from the memory 30, compression is performed by the compression/expansion circuit 32, and then the result is written to the storage medium 200 or 210.

An operation unit 70 is configured by various buttons, a touch panel, and the like and includes a menu button, a set button, a macro button, a multi-frame playback/page break button, a flash setting button, a single shooting/continuous shooting/self timer switch button, and the like. Furthermore, a menu shift + (plus) button, a menu shift − (minus) button, a playback image shift + (plus) button, a playback image shift − (minus) button, a shooting image quality selection button, an exposure correction button, a date/time setting button, and the like are included.

A power source control unit 80 is configured by a battery detection circuit, a DC-DC converter, and a switch circuit for switching blocks to be powered, and the like. Also, the power source control unit 80 performs detection of whether a battery is connected, a type of battery, and the remaining amount of battery, controls the DC-DC converter based on the detection result and an instruction of the system control circuit 50, and then supplies a necessary voltage to respective units including the storage media for a necessary period.

Connectors 82 and 84 connect a power source unit 86 and the power source control unit 80. The power source unit 86 is configured by a primary battery such as an alkali battery and a lithium battery, a secondary battery such as an NiCd battery, an NiMH battery, and an Li-ion battery, an AC adapter, and the like.

Interfaces 90 and 94 are interfaces with storage media such as a memory card and a hard disk, and connectors 92 and 96 are connectors for performing connection with storage media such as a memory card and a hard disk.

Note that description is given assuming that the present embodiment has two systems of interfaces to which storage media are attached and connectors. Of course, the interfaces to which storage media are attached and the connectors may be configured to comprise either a single or plurality of number of systems. Also, a configuration of interfaces and connectors of different standards may be provided in combination.

The interfaces and connectors may be configured to use what complies with a standard such as a PCMCIA card and a CF (compact flash (registered trademark)) card.

Also, in a case where the interfaces 90 and 94 and connectors 92 and 96 are configured to use what complies with a standard such as a PCMCIA card and a CF (compact flash (registered trademark)) card, by connecting various kinds of communication cards, such as a LAN card, a modem card, a USB card, an IEEE 1394 card, a P1284 card, a SCSI card, a communication card for a PHS or the like, it is possible to transfer image data and management information attached to image data with another computer or a peripheral device such as a printer.

It is possible for the optical viewfinder 120 to perform shooting using the optical viewfinder alone without using the electronic viewfinder function by the image display unit 28. Also, within the optical viewfinder 120, some functions of the display unit 54 such as the focus display, the camera shake warning display, the flash charge display, the shutter speed display, the aperture value display, and the exposure correction display are positioned.

A storage medium 130 is a storage medium such as a memory card or a hard disk. The storage medium 130 comprises a storage unit 132 configured by a semiconductor memory, a magnetic disk, or the like; an interface 134 to the image capturing apparatus 100; and a connector 136 for making a connection with the image capturing apparatus 100.

A storage medium 140 is a storage medium such as a memory card or a hard disk. The storage medium 140 comprises a storage unit 142 configured by a semiconductor memory, a magnetic disk, or the like; an interface 144 to the image capturing apparatus 100; and a connector 146 for making a connection with the image capturing apparatus 100.

Figure 2:
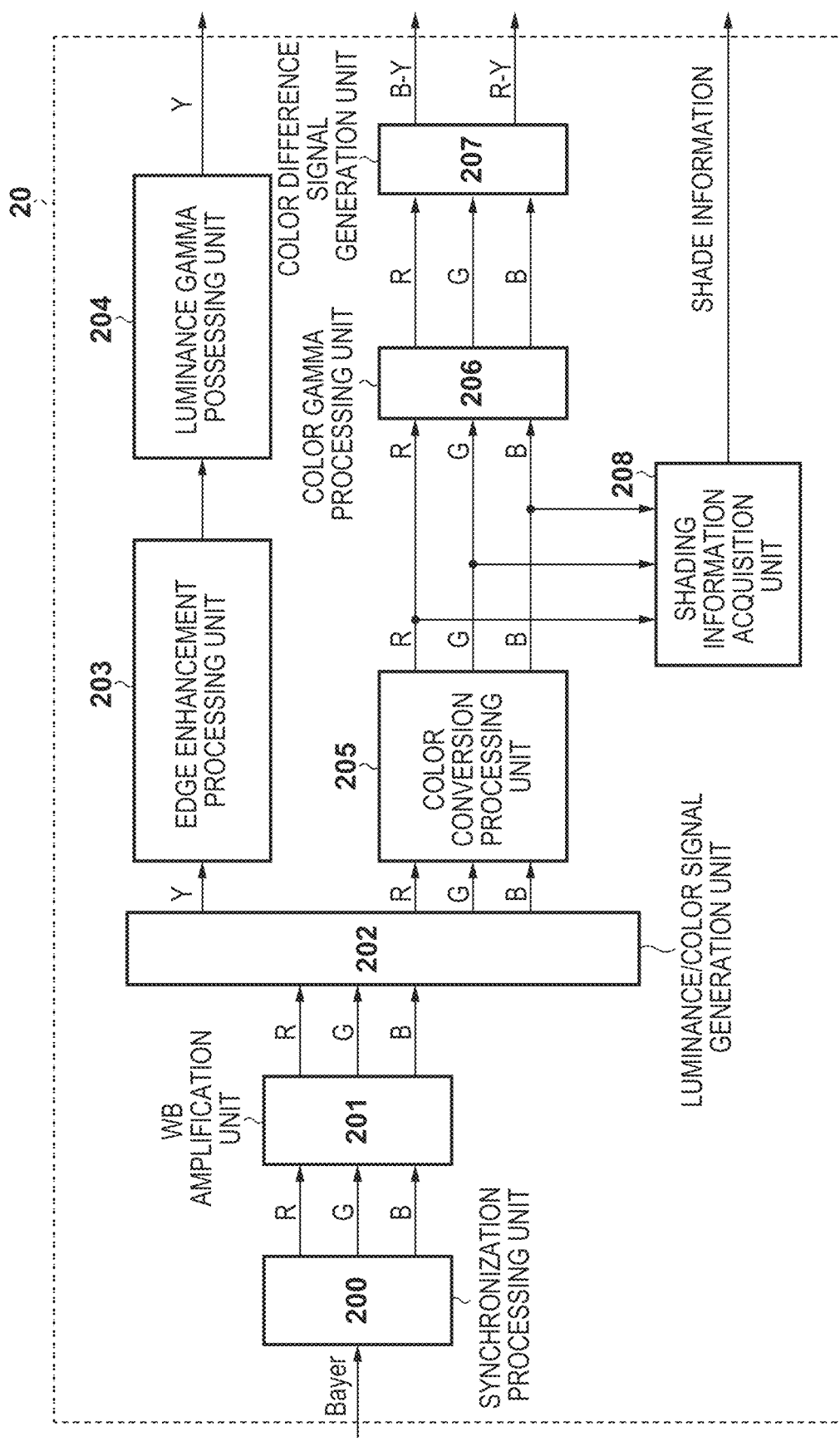
FIG. 2 is a block diagram illustrating a configuration of an image processing circuit.

Next, a detailed configuration of the image processing circuit 20 will be described with reference to FIG. 2. FIG. 2 is a block diagram illustrating a configuration of the image processing circuit 20.

In FIG. 2, the image processing circuit 20 comprises a synchronization processing unit 200, a WB amplification unit 201, a luminance/color signal generation unit 202, an edge enhancement processing unit 203, and a luminance gamma possessing unit 204. Furthermore, the image processing circuit 20 comprises a color conversion processing unit 205, a color gamma processing unit 206, a color difference signal generation unit 207, a shade information acquisition unit 208.

Next, processing in the image processing circuit 20 will be described. The image signal inputted from the A/D converter 16 in FIG. 1 is inputted to the image processing circuit 20.

The image signal inputted to the image processing circuit 20 is inputted to the synchronization processing unit 200. The synchronization processing unit 200 performs synchronization processing in relation to the input image data of Bayer RGB, and generates color signals R, G, B. The WB amplification unit 201 applies a gain to the RGB color signals based on a white balance gain value calculated by the system control circuit 50 and then adjusts the white balance. The RGB signals that the WB amplification unit 201 outputted are inputted to the luminance/color signal generation unit 202. The luminance/color signal generation unit 202 generates a luminance signal Y from the RGB signals and then outputs the generated luminance signal Y to the edge enhancement processing unit 203 and the color signals RGB to the color conversion processing unit 205.

In the edge enhancement processing unit 203, the edge enhancement processing is performed in relation to the luminance signal and then the result is outputted to the luminance gamma possessing unit 204. In the luminance gamma possessing unit 204, gamma correction is performed in relation to the luminance signal Y and then the luminance signal Y is outputted to the memory 30.

The color conversion processing unit 205 converts the RGB signals to desired color balance signals by matrix calculation and the like. In the color gamma processing unit 206, gamma correction is performed on the RGB color signals. In the color difference signal generation unit 207, color difference signals R−Y and B−Y are generated from the RGB signal.

The image signals Y, R−Y, and B−Y outputted to the memory 30 are compressed and encoded by the compression/expansion circuit 32 and then are recorded in the storage unit 132 or the storage unit 142.

Also, the RGB signals which are outputs of the color conversion processing unit 205 are also inputted to the shade information acquisition unit 208. The shade information acquisition unit 208 acquires information for analyzing a state of shades formed on the subject by an environmental light source. For example, the shade information acquisition unit 208 acquires average luminance information of the subject, luminance histogram information of a face region, and the like as shade information.

Next, a configuration and operation of the relighting processing circuit 21 will be described with reference to FIG. 3. In a case where the relighting mode is selected by a user operation, the data outputted from the image processing circuit 20 is inputted to the relighting processing circuit 21 and then the relighting processing by a virtual light source is performed.

Figure 3:
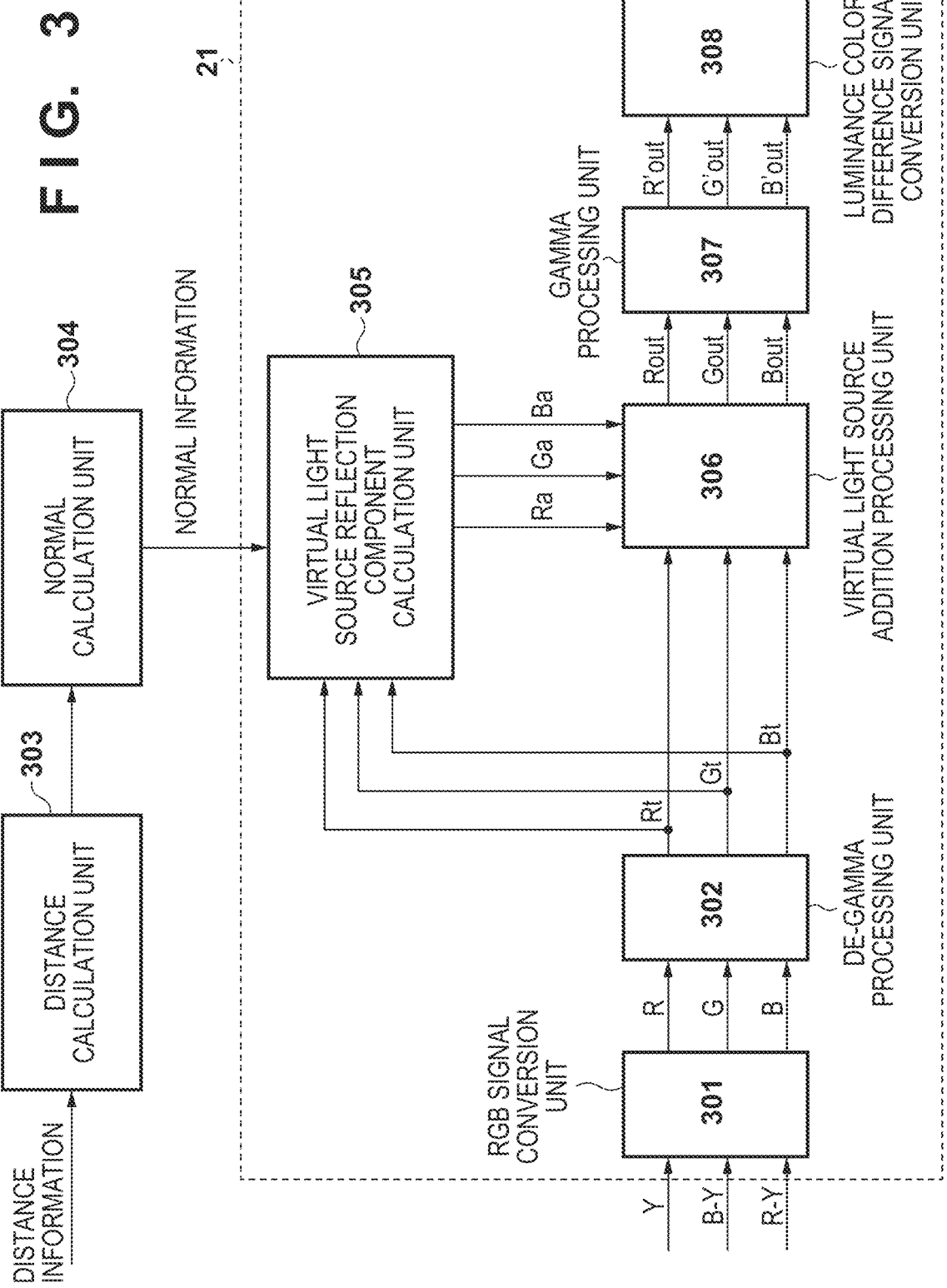
FIG. 3 is a block diagram illustrating a configuration of a relighting processing circuit.

FIG. 3 is a block diagram illustrating a configuration of the relighting processing circuit 21.

In FIG. 3, an RGB signal conversion unit 301 converts the inputted luminance/color difference signals (Y, B−Y, R−Y) to RGB signals. A de-gamma processing unit 302 performs de-gamma processing. A distance calculation unit 303 acquires the distance information between the image capturing apparatus and the subject outputted from the distance measurement sensor 29. A normal calculation unit 304 calculates the normal vector information of the subject. A virtual light source reflection component calculation unit 305 calculates a component that the virtual light source reflected on the subject. A virtual light source addition processing unit 306 adds a relighting effect using the virtual light source. In a gamma processing unit 307, a gamma characteristic is applied to an RGB signal. A luminance/color difference conversion unit 308 converts the RGB signals to the luminance/color difference signals (Y, B−Y, R−Y).

Next, an operation of the relighting processing circuit 21 configured as the above will be described.

The relighting processing circuit 21 reads the luminance/color difference signals (Y, B−Y, R−Y) recorded in the memory 30 as an input. The RGB signal conversion unit 301 converts the inputted luminance/color difference signals (Y, B−Y, R−Y) to the RGB signals and then outputs them to the de-gamma processing unit 302.

The de-gamma processing unit 302 performs computation of a characteristic opposite to the gamma characteristic applied in the gamma processing unit of the image processing circuit 20 and then converts the result to linear data. The de-gamma processing unit 302 outputs the linear-converted RGB signals (Rt, Gt, Bt) to the virtual light source reflection component calculation unit 305 and the virtual light source addition processing unit 306.

Meanwhile, the distance calculation unit 303 calculates a distance map from the subject distance information acquired from the distance measurement sensor 29. The subject distance information is two-dimensional distance information obtained in pixel units of the shot image. The normal calculation unit 304 calculates a normal map from the distance information acquired from the distance calculation unit 303. Assume that a known technique is used for a method of generating the normal map from the distance map; however, a detailed processing example will be described with reference to FIG. 4.

Figure 4:
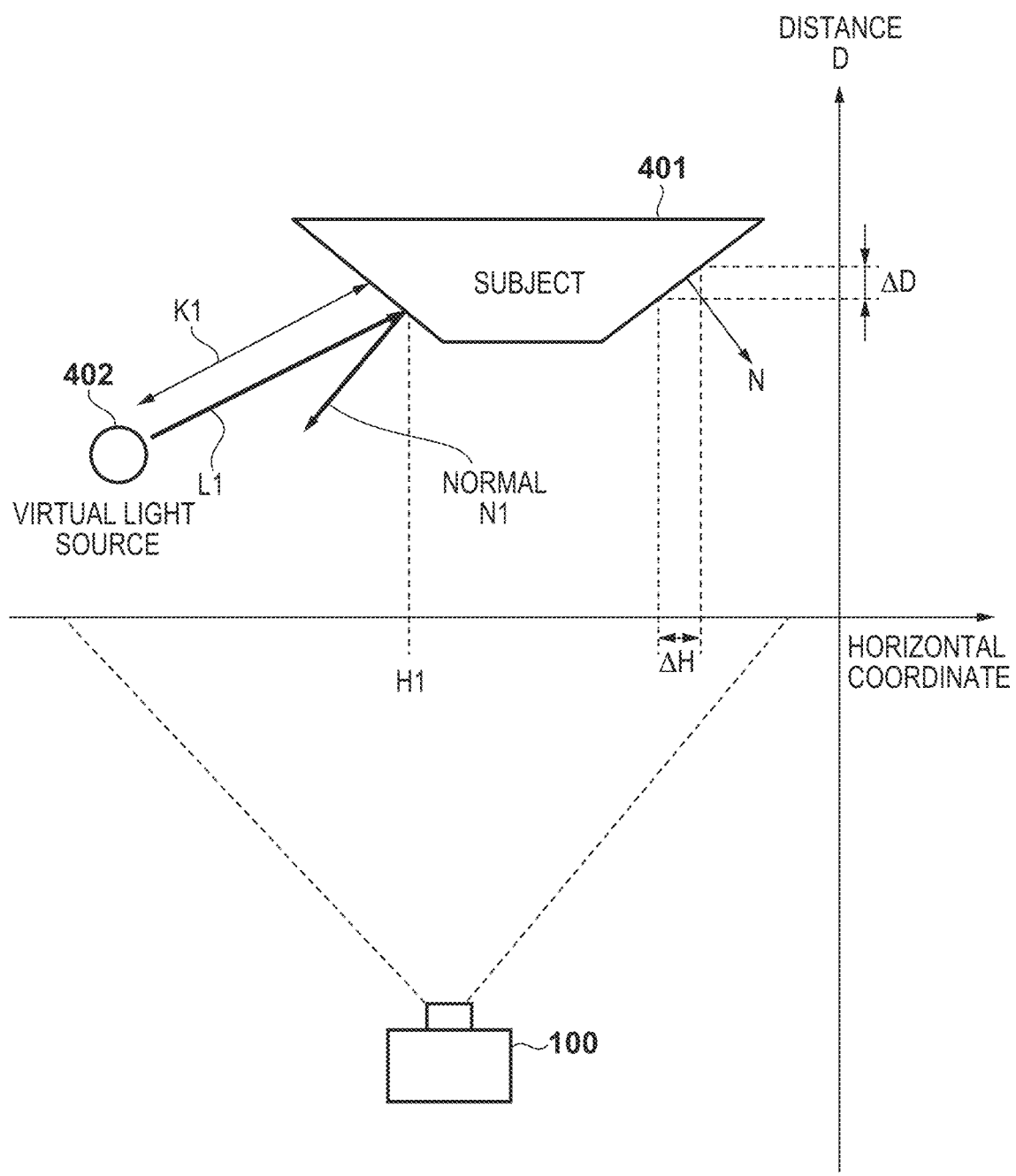
FIG. 4 is a view describing reflection by radiation of a virtual light source.

FIG. 4 is a view illustrating a relationship between coordinates of the image capturing apparatus 100 and the subject. For example, for a subject 401 as illustrated in FIG. 4, gradient information can be calculated from a difference ΔD in a distance (depth) D in relation to a difference ΔH in a horizontal direction of a shot image, and then a normal vector N information can be calculated from the gradient information. By performing the above processing for each of the shot pixels, the normal vector N information for each pixel of the shot image can be calculated. The normal calculation unit 304 outputs the normal vector information corresponding to each pixel of the shot image to the virtual light source reflection component calculation unit 305 as a normal map.

In the virtual light source reflection component calculation unit 305, the component that the set virtual light source reflects on the subject is calculated based on a distance K between a light source and the subject, the information of a normal vector N, and the information of a virtual light source direction vector L.

Specifically, a reflection component of a coordinate position corresponding to the shot image is calculated so as to be inversely proportional to a square of the distance K between the light source and the subject and to be proportional to a dot product of the normal vector N of the subject and the light source direction vector L.

This will be described with reference to FIG. 4. In FIG. 4, the position of the subject 401 and the position of a set virtual light source 402 are illustrated. The reflection component at a positional coordinate H1 (vertical pixel position is omitted to make the description easier to understand) of horizontal pixels of the image shot by the image capturing apparatus 100 is a value proportional to a dot product of a normal vector N1 and a direction vector L1 of the virtual light source at the coordinate H1 and inversely proportional to a square of a distance K1 between the virtual light source 402 and the subject 401.

When this relationship is expressed in equations, a subject reflection component (Ra, Ga, Ba) according to the virtual light source is as follows:

$$Ra = \alpha \times (-L/N)/K2 \times Rt$$

$$Ga = \alpha \times (-L/N)/K2 \times Gt$$

$$Ba = \alpha \times (-L/N)/K2 \times Bt \qquad (1)$$

Here, α is intensity of the virtual light source and is a gain value of a relighting correction amount. L is a three-dimensional direction vector of the virtual light source, N is a three-dimensional normal vector of the subject, and K is a distance between the virtual light source and the subject. Rt, Gt, and Bt are shot RGB data outputted from the de-gamma processing unit 302.

The reflection components (Ra, Ga, Ba) by the virtual light source calculated as in the above are outputted to the virtual light source addition processing unit 306. In the virtual light source addition processing unit 306, the following processing for adding the virtual light source components (Ra, Ga, Ba) is performed.

$$Rout=Rt+Ra$$

$$Gout=Gt+Ga$$

$$Bout=Bt+Ba \quad (2)$$

The image signals (Rout, Gout, Bout) outputted from the virtual light source addition processing unit 306 are inputted to the gamma processing unit 307. In the gamma processing unit 307, gamma correction is performed on the RGB input signals. In the color difference signal generation unit 308, a luminance signal Y, and color difference signals R−Y and B−Y are generated from the RGB signal.

Figure 5A:
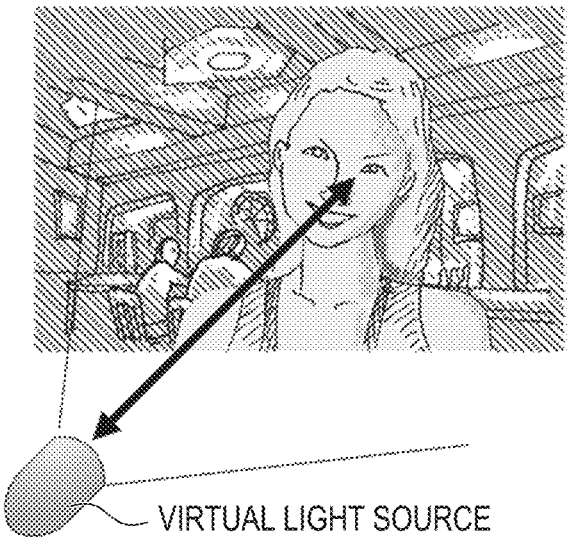
FIGS. 5A and 5B are views describing an image before and after relighting processing.
Figure 5B:
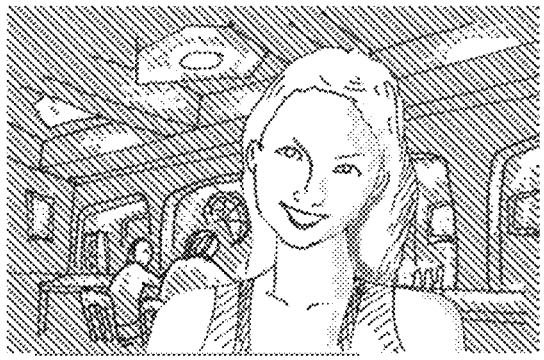

As described above, the relighting processing circuit 21 operates. FIGS. 5A and 5B illustrate an example in which the relighting processing is performed by the relighting processing circuit 21. FIG. 5A illustrates a shot image before the relighting processing, and FIG. 5B illustrates an example of the shot image after the relighting processing. A subject, which was dark in FIG. 5A, by applying a virtual light source and then performing relighting processing, is corrected to be brighter as in FIG. 5B.

The system control circuit 50, by control of the memory control circuit 22, stores the luminance/color difference signals outputted by the relighting processing circuit 21 in the memory 30 and then performs compression and encoding in the compression/expansion circuit 32. Also, the result is recorded in the storage unit 132 or the storage unit 142.

Figure 6:
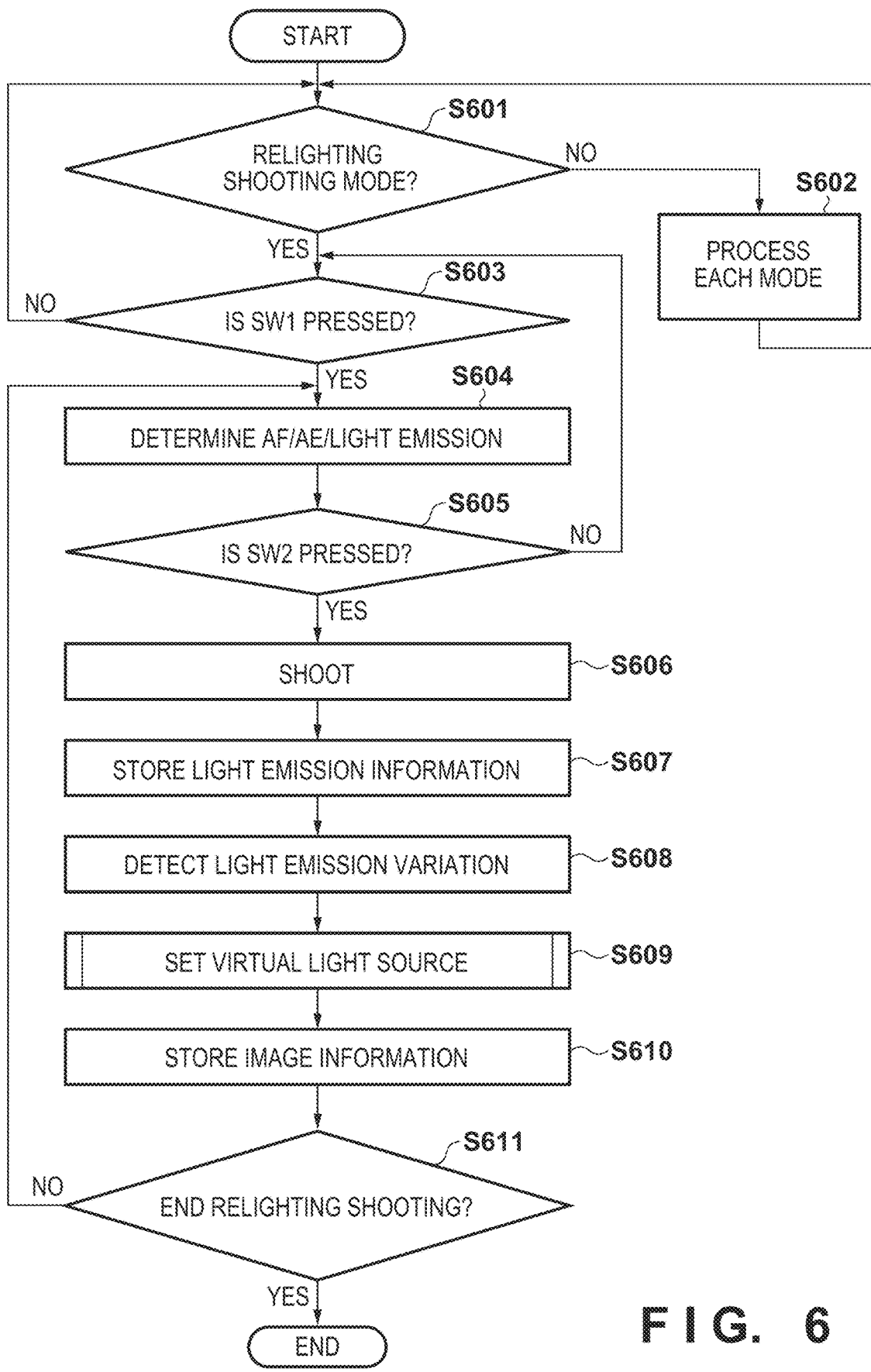
FIG. 6 is a flowchart illustrating a relighting shooting operation.

FIG. 6 is a flowchart illustrating the operation of the system control circuit 50. Hereinafter, the operation for deciding the parameters of the virtual light source of the relighting processing circuit 21 based on the information of the image capturing apparatus acquired by the system control circuit 50 will be described in accordance with the flowchart in FIG. 6.

First, in step S601, the system control circuit 50 determines whether or not the setting state of a mode dial 60 is the relighting shooting mode. If not the relighting shooting mode, the processing advances to step S602, and then the processing of each mode (e.g., moving image shooting mode, playback mode) is executed. In the present embodiment, the relighting shooting mode is selected by the mode dial 60; however, configuration may be taken so as to select a relighting setting by a detailed setting of the still image shooting mode.

In step S603, the system control circuit 50 determines whether or not the user pressed the shutter switch SW1 (62). If pressed, the processing advances to step S604, and if not pressed, the processing returns to step S601.

In step S604, the system control circuit 50 performs the AF (autofocus) processing and the AE (auto-exposure) processing. Specifically, the system control circuit 50 adjusts the focus of the shooting lens 10 to the subject based on the AF result and also performs the decision of the aperture value, shutter release time, and determination of emission of the flash 48 from the AE result. Then, these decided values are stored in the internal memory of the system control circuit 50 or the memory 52 and then the processing advances to step S605.

In step S605, the system control circuit 50 examines the state of the shutter switch SW2 ((4). If released, the processing returns to step S603, and if pressed, the processing advances to step S606.

In step S606, the system control circuit 50 controls the shutter 12 having the aperture function by the exposure control unit 40 in accordance with the aperture value, the shutter release time, and the light emission determination stored in the internal memory of the system control circuit 50 or the memory 52. Also, the flash 48 is controlled by the system control circuit 50, and then the image capturing element 14 is caused to be exposed. Then the electrical charge signal is read from the image capturing element 14, and the image data is temporarily written to the memory 30 via the A/D converter 16, the image processing circuit 20, and the memory control circuit 22.

In step S607, the system control circuit 50 stores the light emission information of the flash 48 in step S606 in the memory 30 and then advances to step S608. The light emission information here is information that includes at least one of whether the flash was emitted or not emitted, the amount of light emitted by the flash, the charge information of the flash, and the light emission information of images shot in the past is also stored.

In step S608, the system control circuit 50 detects the light emission variation based on the light emission information stored in step S607 and then advances to step S609. Conventional methods may be used for the method of detecting light emission variation. For example, the light emission variation may be determined by comparing the light emission determination in step S604 and the light emission information stored in step S607, or the light emission variation may be determined by comparing the past light emission information stored in step S607 and the current light emission information. Particularly, in continuous shooting involving flash emission, there are cases where charging for emitting the flash does not make it in time for the next shooting and then a light emission is missed or a light amount insufficiency occurs; however, the light emission variation can be detected by the above methods.

In step S609, the system control circuit 50 reads the image data stored in the memory 30, performs setting (details will be described later) of the source of virtual light applied onto the subject, and then stores the result in the memory 30 again. Furthermore, predetermined compression processing such as that of the JPEG format is performed in the compression/expansion circuit 32 in relation to the image data for which processing for applying the virtual light source stored in the memory 30 has been performed, and then the result is written to the storage medium 130 or 140.

In step S611, the system control circuit 50 determines whether or not the relighting shooting is ended. In a case where the relighting shooting is to be continued, the processing returns to step S604 and then the processing from steps S604 to S611 is repeated, and otherwise, this flow is ended.

Figure 7:
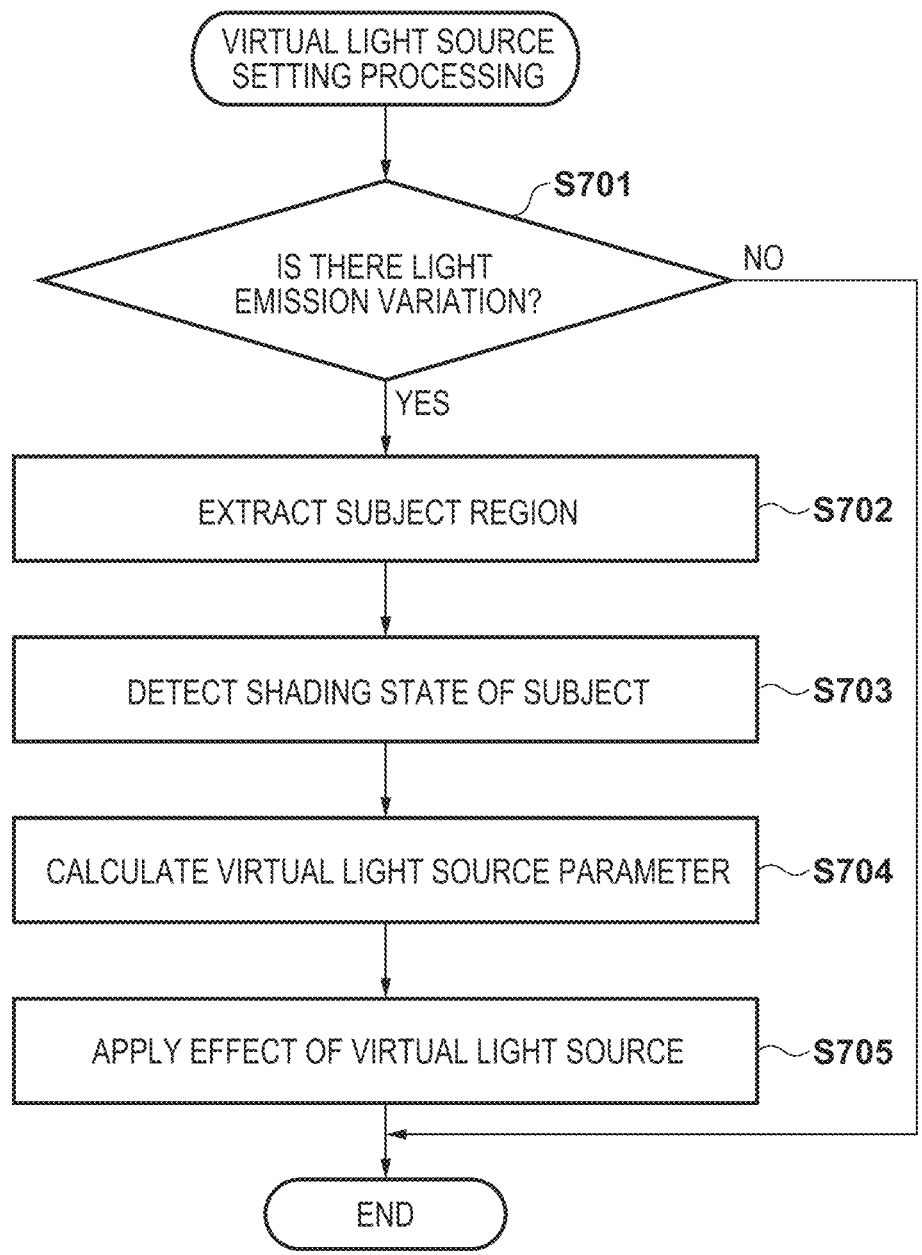
FIG. 7 is a flowchart illustrating an operation of processing for setting the virtual light source.

Next, processing for setting the virtual light source in step S609 will be described with reference to the flowchart in FIG. 7.

In step S701, the system control circuit 50 determines whether or not there was light emission variation in the flash based on the detection result in step S608. In a case where there was light emission variation, the processing advances to step S702 in order to perform the relighting processing. In a case where there was no light emission variation, the processing ends without performing the relighting processing. Note that in the present embodiment, in a case where there is no light emission variation, it was described so as to end the relighting processing; however, configuration may be taken so as not to end the relighting processing even in a case where there is no light emission variation and cause the relighting effect not to be applied using the setting of parameters of the virtual light source and the like. Also, a predetermined threshold may be set to determine the presence or absence of light emission variation so that even in a case where there is light emission variation, if the variation is a threshold value or below, the case is treated as though there were no light emission variation.

In step S702, the system control circuit 50 uses the image processing circuit 20 and then extracts a subject region from the image data stored in the memory 30.

Figure 8:
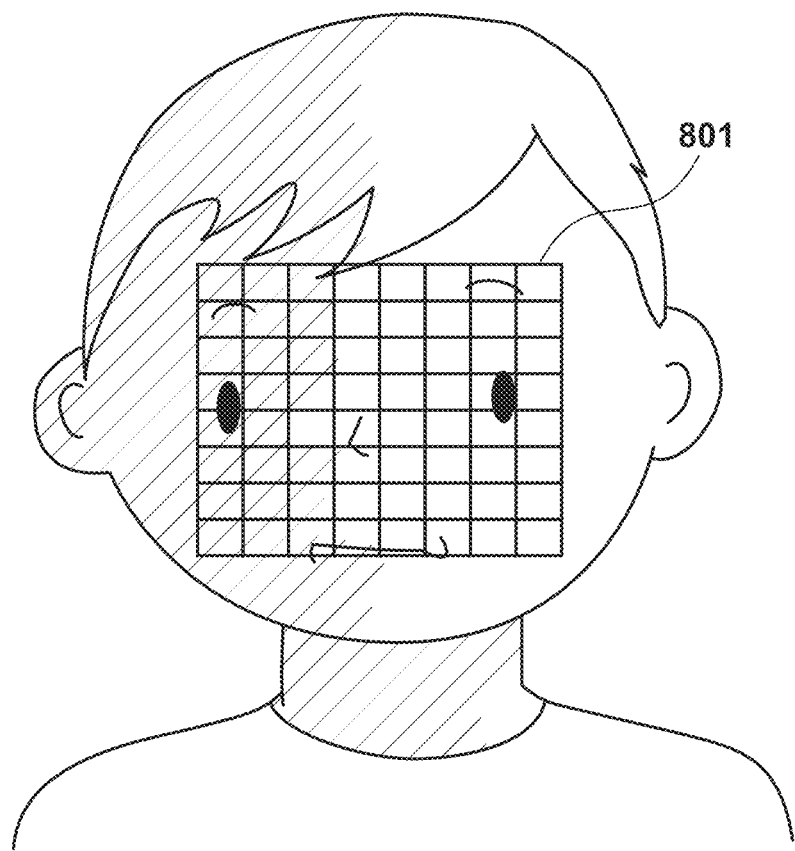
FIG. 8 is a view describing division of blocks in a subject region.

In step S703, the system control circuit 50 detects the shading state of the subject. For the detection of the shading state of the subject, the distribution of brightness within the subject region is used in the present embodiment, for example; however, information indicating contrast within the subject region, a characteristic of the edges of the region in which shading is occurring within the subject region, information indicating the area of the region in which shading is occurring within the subject region, and the like may also be used. In order to detect the distribution of brightness within the subject region, a subject region 801 is divided into a plurality of portions (e.g., 8×8=64 blocks) as illustrated in FIG. 8, for example, and then the average luminance value is calculated for every divided block. In FIG. 8, the subject is illustrated as a person as an example; however, configuration may be such that the subject is not be a person.

In step S704, the system control circuit 50 calculates a virtual light source parameter based on the shading state of the subject detected in step S703. The virtual light source parameter includes at least one of a direction, position, intensity, irradiated area, and color of the virtual light source.

Also, in the present embodiment, in continuous shooting involving flash emission, the objective is to prevent the variation in brightness of the subject in the continuous shooting images due to the light emission variation. Therefore, in a case where the light emission variation is detected in step S608, in the present embodiment, comparison is performed with at least one of the pieces of image data shot continuously before or after the image (image of interest) in which the light emission variation was detected and then the virtual light source parameter is set. Here, in order to make it easier to understand, the description will be given assuming that the comparison is performed with image data shot before.

First, a difference in the average luminance values of respective blocks of the image data (image of interest) corresponding to the light emission variation and the image data shot continuously before that are calculated for each block. Then, the virtual light source parameter is set so that the difference of each block is reduced. As an example, a simple method for deciding the virtual light source parameter will be described.

First, a setting for the angle of the virtual light source will be described. In order to make the description easier to understand, only a component in a horizontal direction will be described; first, a weight is added to each block of the 8 horizontal blocks. On the inner side of the face, the closer the blocks are to the outer edges, the heavier their weights are made, and the evaluation value is calculated by multiplying the luminance difference and the weight of each block. Then, a sum of the evaluation values is calculated separately for each of the left and right sides of the face. The virtual light source is caused to be applied to the subject from a direction whose sum of the evaluation values calculated separately for the left and right sides is greater. At that point in time, the angle of the virtual light source is decided in accordance with the difference in the evaluation values between the left and right sides of the face. For example, the angle when the difference in the evaluation values is the predetermined value or more is set to 45 degrees, and the smaller the difference, the closer the angle of the light source will be to 0 degrees (front). In a case where the sum of the evaluation values of left and right sides is larger for the right side of the face and the difference in the evaluation values is the predetermined value or more, the virtual light source parameter may be set so that the virtual light source is radiated from 45 degrees on the right side of the face. In a case where the difference between the left and right sides is less than the predetermined value, the setting is performed so that the virtual light source is applied from a position that is closer to the front. The angle of the virtual light source can be decided in the same manner also for a vertical direction.

Next, a setting for the intensity of the virtual light source will be described. A target value of brightness after illuminating with the virtual light source is set to an average value (image signals (Rout1, Gout1, Bout1)) of the brightness of the subject of the image data shot continuously before the image of interest, for example. The virtual light source parameter is set so that the target value and the image signals (Rout2, Gout2, Bout2) of the subject of the image of interest are close. The brightness of the subject of the image of interest may be an average of the entire subject region or may be an average of the side on which the virtual light source is radiated. By changing intensity α2 of the virtual light source and a distance K2 of the subject and the virtual light source in the image of interest, the virtual light source parameter is set so that the difference between Rout1 and Rout2, Gout1 and Gout2, and Bout1 and Bout2 are the predetermined value or within.

In step S705, processing for adding the effect of the virtual light source by the virtual light source addition processing unit 306 is performed using the virtual light source parameter decided in step S704.

Also, in a case where the subject of the image data shot continuously had been moving significantly by a predetermined amount or more, equalizing the brightness of the subject before and after by the relighting processing will be difficult; therefore, configuration may be taken so as not to conduct correction based on the virtual light source parameter. A method for detecting the movement of the subject may be a conventional method, and the movement of the subject may be calculated from the movement of the image capturing apparatus using a gyro which detects the movement of the image capturing apparatus, for example. Alternatively, a motion vector of the subject may be calculated from image capture data from before and after, and then the subject may be deemed to have moved in a case where the size of the motion vector is a predetermined value or more.

Also, in the present embodiment, a case where brightening correction is performed by relighting was described; however, conversely, relighting for dimming may be performed. In such a case, the gain value a of the virtual light source is set to a negative.

Also, a method for calculating the position of the virtual light source and the distance D of pixels to be processed is not limited to the method of the present embodiment and any calculation method may be used. For example, the position of the camera and the position of the subject may be acquired as three-dimensional positions and then a three-dimensional distance may be calculated.

Also, in a case where an effect of the virtual light source is added, calculation is performed using an equation in which the amount of the virtual light source component is inversely proportional to a square of the distance; however, the degree to which the effect of the virtual light source is added is not limited to what is calculated in this manner. For example, the amount of the virtual light source component may be inversely proportional to the distance D or an equation by which the irradiation range changes in the form of a Gaussian distribution may be used.

Also, in the present embodiment, an example in which the camera information is acquired for each frame and then setting of the parameter of the virtual light source is processed in real time was described; however, the invention is not limited to this. Configuration may be taken so as to acquire the camera information for every few frames rather than for each frame.

Second Embodiment

Next, a second embodiment of the present invention will be described. Note that the block configuration of the image capturing apparatus of the second embodiment is the same as the image capturing apparatus of the first embodiment illustrated in FIG. 1; therefore, description will be omitted. Hereinafter, description will be given placing the main focus on what is different from the first embodiment.

In the first embodiment, in step S704, comparison is performed with at least one of the pieces of image data shot continuously before or after the image of interest, the image of interest being an image in which the light emission variation in the flash was detected, and then the virtual light source parameter is set. In contrast to this, in the second embodiment, configuration may be so that a plurality of pieces of image data is used so long as they have been shot continuously.

Figure 9:
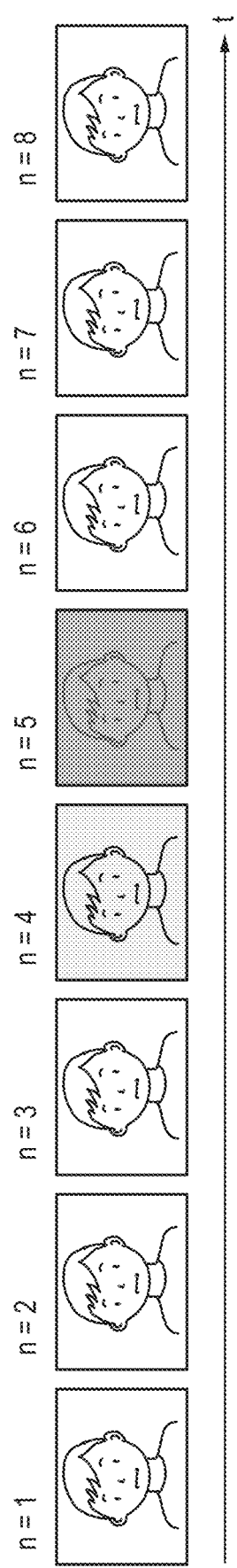
FIG. 9 is a view in which images shot by continuous shooting involving flash emission are lined up in chronological order.

FIG. 9 is a view in which images shot by continuous shooting involving flash emission are lined up in chronological order. The fourth frame represents a frame in which the amount of light emitted is insufficient, and the fifth frame represents a frame in which there was no emission of light.

In a case where the image of interest is the fourth frame, there is no problem in setting the immediately preceding third frame as the only image for comparison; however, in a case where the image of interest is the fifth frame, the accuracy for correcting relighting will deteriorate if the only image for comparison is the immediately preceding fourth frame. Accordingly, assuming a case where the image of interest is like the fifth frame, so long as the image has been shot within a predetermined length of time from when the image of interest was captured, a plurality of image data before and after the image of interest (image data of a predetermined range) are to be targeted for comparison. For example, second, third, fourth, sixth, seventh, and eighth frames are treated as image data to be targeted for comparison. In the above, the image data shot within a predetermined length of time from when the image of interest was captured is set to be the image data targeted for comparison; however, images that are continuous before and after the image of interest within a preset number may be set to be the image data to be targeted for comparison.

In step S704, in a case where there is a plurality of pieces of image data to be targeted for comparison, the virtual light source parameter may be calculated by setting the brightness of the subject to be the target value from a single image selected from among the image data for comparison, such as setting the target brightness of the virtual light source to be the same as the image that is the brightest among the plurality of pieces of image data to be targeted for comparison. Also, for the brightness of the subject in each image for comparison, the virtual light source parameter may be calculated by making the weight of the images for comparison that is closer in time to the image of interest to be heavier and then setting the weighted average of the brightness as the target brightness. Alternatively, the parameter may be set based on a weighted average value of the virtual light source parameters obtained for each image for comparison, or may be set to the virtual light source parameter obtained from a single image selected from among the images for comparison.

Accordingly, in the second embodiment, even in a case where the light emission variation has occurred continuously, it is possible to prevent the variation in the brightness of the subject.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-056619, filed Mar. 26, 2020 which is hereby incorporated by reference herein in its entirety.

What is claimed is:

1. An image processing apparatus comprising:
   at least one processor or circuit configured to function as:
      a first acquisition unit configured to acquire a plurality of images shot by continuous shooting while emitting a flash;
      a second acquisition unit configured to acquire light emission information of the flash for each shot in the continuous shooting;

a detection unit configured to detect a light emission variation of the flash in the continuous shooting based on the light emission information;

a setting unit configured to set a parameter of a virtual light source for correcting a variation of brightness of the plurality of images shot by the continuous shooting due to the light emission variation between the plurality of images based on a result of detecting the light emission variation; and a correction unit configured to correct at least one image in the plurality of images shot by the continuous shooting based on the set parameter of the virtual light source.

2. The image processing apparatus according to claim 1, wherein the correction unit selects an image to be corrected by the virtual light source from among the plurality of images shot by continuous shooting based on the result of detecting the light emission variation and then corrects the image.

3. The image processing apparatus according to claim 1, further comprising: a storage device configured to store the light emission information.

4. The image processing apparatus according to claim 1, wherein the light emission information includes at least one of information on whether the flash emitted light or did not emit light, information on a light emission amount of the flash, and charge information of the flash.

5. The image processing apparatus according to claim 1, wherein the setting unit sets at least one of a direction, a position, an intensity, a range, and a color of the virtual light source as the parameter of the virtual light source.

6. The image processing apparatus according to claim 1, wherein the setting unit compares an image to be corrected and at least one of images that were shot before or after that image and sets the parameter of the virtual light source in accordance with a result of the comparison.

7. The image processing apparatus according to claim 1, wherein the setting unit compares an image to be corrected and an image that was shot in a predetermined range before or after that image and sets the parameter of the virtual light source in accordance with a result of the comparison.

8. The image processing apparatus according to claim 7, wherein the predetermined range is a range of a predetermined length of time or a range of a predetermined number of images before or after, in relation to the image to be corrected.

9. The image processing apparatus according to claim 7, wherein the setting unit sets the parameter of the virtual light source using a brightness, which is a weighted average of brightnesses of a subject in a plurality of images shot in the predetermined range, as a target brightness in a case of illuminating using the virtual light source.

10. The image processing apparatus according to claim 7, wherein the setting unit sets the parameter of the virtual light source using a brightness of a subject in one image selected from a plurality of images shot in the predetermined range as a target brightness in a case of illuminating using the virtual light source.

11. The image processing apparatus according to claim 7, wherein the setting unit performs weighted averaging of parameters of the virtual light source obtained based on a brightness of a subject in each of a plurality of images shot in the predetermined range and sets the parameter of the virtual light source.

12. The image processing apparatus according to claim 1, wherein the at least one processor or circuit is configured to further function as:

a movement detection unit configured to detect a movement of a subject, wherein in case where the movement of the subject is a predetermined amount or more, the correction unit does not perform the correction.

13. An image capturing apparatus comprising:

an image capturing device configured to capture a subject; and an image processing apparatus including at least one processor or circuit configured to function as:

a first acquisition unit configured to acquire a plurality of images shot by continuous shooting while emitting a flash;

a second acquisition unit configured to acquire light emission information of the flash for each shot in the continuous shooting;

a detection unit configured to detect a light emission variation of the flash in the continuous shooting based on the light emission information;

a setting unit configured to set a parameter of a virtual light source for correcting a variation of brightness of the plurality of images shot by the continuous shooting due to the light emission variation between the plurality of images based on a result of detecting the light emission variation; and a correction unit configured to correct at least one image in the plurality of images shot by the continuous shooting based on the set parameter of the virtual light source.

14. The image capturing apparatus according to claim 13, further comprising the flash.

15. A method of controlling an image processing apparatus, the method comprising:

acquiring a plurality of images shot by continuous shooting while emitting a flash;

acquiring light emission information of the flash for each shot in the continuous shooting;

detecting a light emission variation of the flash in the continuous shooting based on the light emission information;

setting a parameter of a virtual light source for correcting a variation of brightness of the plurality of images shot by the continuous shooting due to the light emission variation between the plurality of images based on a result of detecting the light emission variation; and correcting at least one image in the plurality of images shot by the continuous shooting based on the set parameter of the virtual light source.

16. A non-transitory computer-readable storage medium operable to store a program for causing a computer to function as each of units of an image processing apparatus, the image processing apparatus comprising:

a first acquisition unit configured to acquire a plurality of images shot by continuous shooting while emitting a flash;

a second acquisition unit configured to acquire light emission information of the flash for each shot in the continuous shooting;

a detection unit configured to detect a light emission variation of the flash in the continuous shooting based on the light emission information;

a setting unit configured to set a parameter of a virtual light source for correcting a variation of brightness of the plurality of images shot by the continuous shooting due to the light emission variation between the plurality of images based on a result of detecting the light emission variation; and a correction unit configured to correct the at least one image in the plurality of images shot by the continuous shooting based on the set parameter of the virtual light source.

* * * * *